M. MUGGERIDGE.
GEARING.
APPLICATION FILED APR. 11, 1913.
1,187,007.
Patented June 13, 1916.
2 SHEETS—SHEET 1.
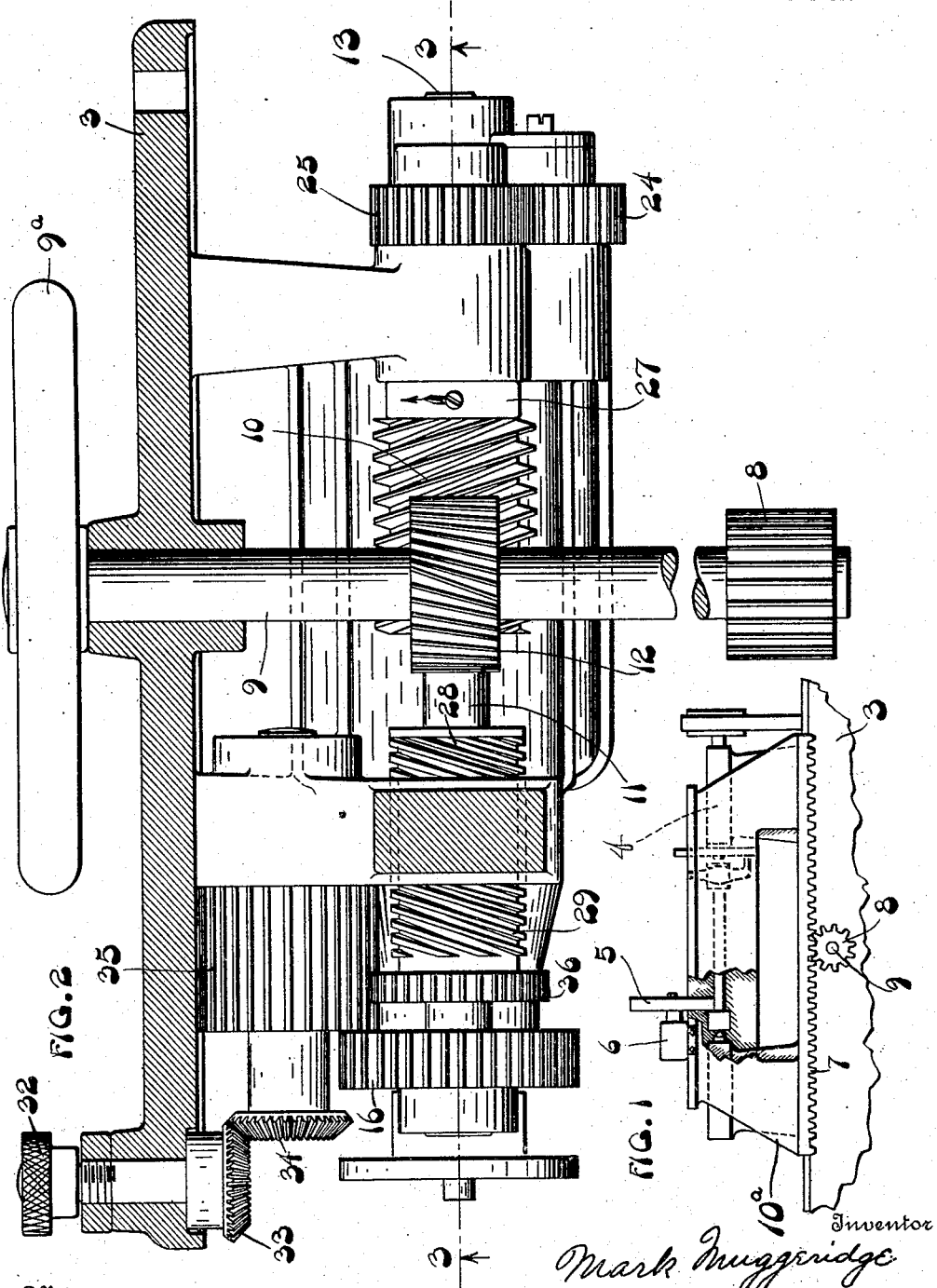

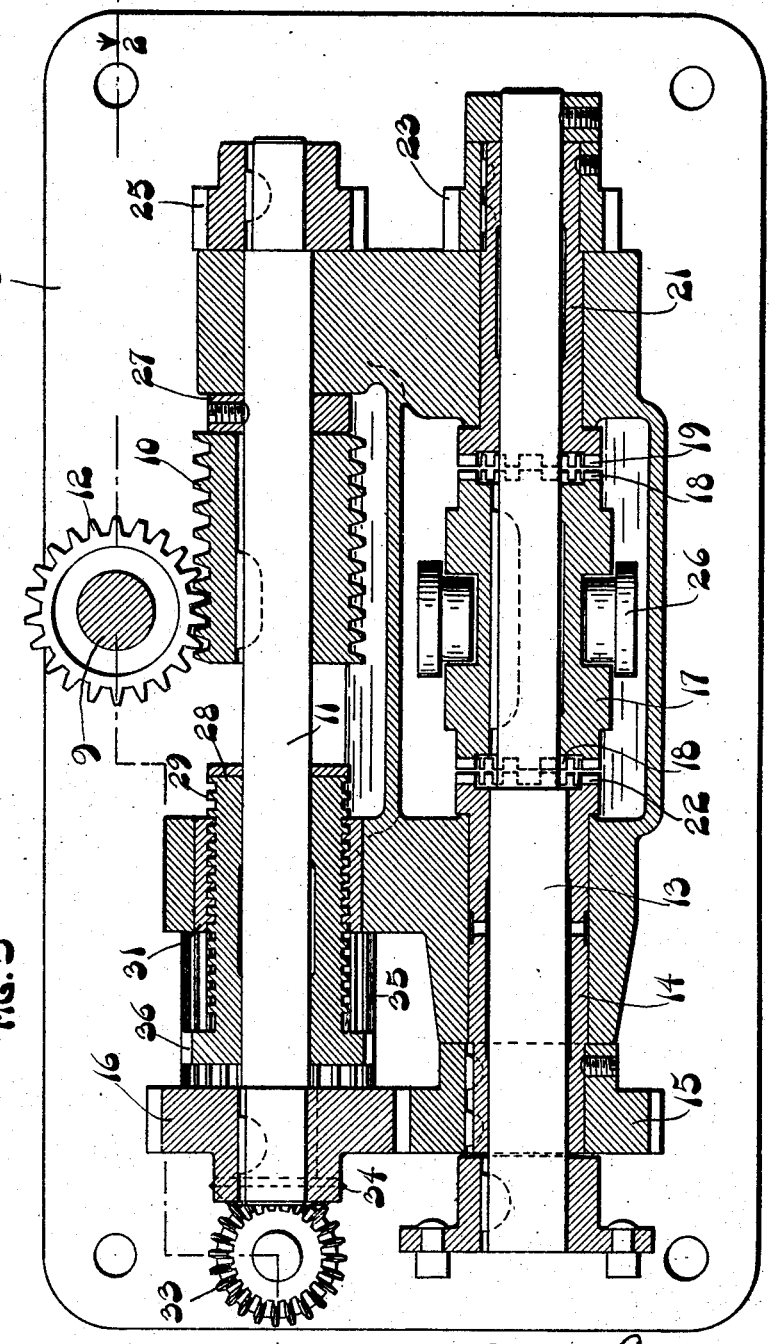

UNITED STATES PATENT OFFICE.

MARK MUGGERIDGE, OF NORWOOD, OHIO, ASSIGNOR TO THE QUEEN CITY MACHINE TOOL COMPANY, OF CINCINNATI, OHIO, A CORPORATION OF OHIO.

GEARING.

1,187,007.  Specification of Letters Patent.  Patented June 13, 1916.

Application filed April 11, 1913. Serial No. 760,385.

*To all whom it may concern:*

Be it known that I, MARK MUGGERIDGE, a citizen of the United States of America, and resident of Norwood, county of Hamilton, and State of Ohio, have invented certain new and useful Improvements in Gearing, of which the following is a specification.

This invention relates to grinding machines, and particularly machines in which the grinding tool and the article to be ground or finished are caused to reciprocate relatively to each other, during the grinding operation.

An object of the invention is to produce new and improved means for controlling the relative reciprocatory motion between the grinding tool and the article to be ground, so that the tool dwells or remains at each end of its travel, relatively to the article, a sufficient time to compensate for the fact that it moves twice across the intermediate portions of the article, during the grinding operation.

A further object is to produce improved means, capable of accurate adjustment, for controlling the relative reciprocatory motion between the grinding tool and the article to be ground.

These and other objects I attain in an apparatus embodying the features herein described, and illustrated in the drawings accompanying and forming a part of my invention.

In the drawings Figure 1 is a side elevation of a work-holding table, a motor-driven grinding wheel, and the actuating gear for reciprocating the carriage of the wheel relatively to the table. Fig. 2 is a sectional view along the line 2—2 of Fig. 3, and illustrates an actuating and control mechanism for the driving gear of the carriage. Fig. 3 is a transverse sectional view along the line 3—3 of Fig. 2.

The apparatus, illustrated, consists of a frame 3, a work-holding table 4, movable along ways provided on the frame, a grinding wheel 5, for engaging work mounted on the table, a reciprocable carriage 10ᵃ for the wheel 5, a power transmission mechanism, for imparting reciprocatory motion to the carriage, and adjustable means for controlling the operation of the transmission mechanism.

As illustrated, the grinding wheel 5 is actuated by means of a motor 6, and is so mounted on its carriage 10ᵃ that it is capable of engaging and grinding the surface of work mounted on the table 4, as the carriage reciprocates. The motor 6 may, of course, be replaced by any suitable means for driving the grinding wheel, and the work table 4 may be provided with any suitable means for mounting the work in place. As illustrated, the table is provided with a head stock and a tail stock, and means for rotating the work mounted thereon, but it will be understood that any suitable means may be employed for presenting the work to the grinding tool, and that the specific construction of the table may be greatly varied, without in any way departing from the spirit of the invention.

As illustrated, the reciprocable carriage 10ᵃ is provided with a rack 7, which forms a part of the power transmission mechanism and with which a gear 8 continuously meshes. The gear 8 is driven first in one direction and then the other, for the purpose of moving the carriage, back and forth along its ways and along the work on the table. A driving shaft 9 is operatively connected, by any suitable means, to the gear 8 and is driven by means of a worm 10, mounted on a shaft 11, and a worm gear 12, which meshes with the worm 10. The worm gear 12, is mounted on the shaft 9.

The shaft 11 is journaled in suitable bearings on the frame 3, and is capable of being driven in one direction or the other, by means of a shaft 13, which is journaled on the frame portion of the machine and is operatively connected to the source of power, so that it continuously rotates in one direction during the operation of the machine. As illustrated, one end of the shaft 13 is surrounded by and journaled in a sleeve 14, which is itself journaled on the frame 3. A gear 15 is mounted on the sleeve 14 and continuously meshes with a gear 16, which is mounted on the shaft 11. The other end of the shaft 13 is surrounded by and journaled in a sleeve 21, which is journaled in the frame 3. A pinion 23 is rigidly mounted on the sleeve 21, and continuously meshes with a gear 24 which is journaled on the frame portion of the machine and which in turn continuously meshes with a gear 25, rigidly mounted on the shaft 11. The shaft 11 is driven in one direction by the sleeve 14 and the gears 15 and 16, and is driven in the other direction by the sleeve 21 and the gears 23, 24 and 25.

As illustrated, one sleeve or the other is capable of being operatively connected to the shaft 13, by means of a clutch mechanism 17, which consists of a collar splined on the intermediate portion of the shaft 13, between the inner ends of the sleeve, and capable of being moved along the shaft into engagement with one sleeve or the other. The collar is provided at each end with a set of longitudinally projecting clutch teeth 18. The sleeve 21 is provided with a set of teeth 19, which are adapted to coöperate with one of the sets of teeth 18 on the collar and to thereby operatively lock the sleeve to the collar, and consequently, to the shaft 13. The sleeve 14 is provided with a set of teeth 22, which is capable of coöperating with one set of the teeth 18, and of thereby locking the sleeve 21 to the collar, and consequently, to the shaft.

Any suitable means may be employed for sliding the collar into operative connection with one or the other of the sleeves, and for thereby rendering one sleeve operative and the other inoperative as the driving agent of the shaft 11. With the illustrated arrangement of gears located between the separate sleeves and the shaft 11, the sleeve 14 will drive the shaft 11 in one direction and the sleeve 21 will drive it in the other direction.

As illustrated, I have provided a lever arm 26, which is operatively connected to the collar 17, and which is adapted to reciprocate the collar, in the manner just described, for the purpose of reciprocating the carriage 10$^a$ along its ways. Any suitable means may be employed for actuating the lever 26, and, if desired, it may be controlled by the motion of the carriage, as is customary with such devices.

The worm 10 is splined onto the shaft 11 and is capable of reciprocating longitudinally thereof, between a collar 27, rigidly mounted on the shaft, and a sleeve 28, which is rotatably mounted on the shaft and which is capable of moving longitudinally along the shaft. The sleeve 28 is provided on its cylindrical face with a screw-thread or worm 29, which meshes with a suitably tapped nut 31, rigidly mounted on the frame of the machine and through which the sleeve 28 extends. This sleeve 28 forms an adjustable stop for the worm 10, and is capable of being shifted to different positions longitudinally of the shaft 11, by means of a milled-headed nut 32, beveled gears 33 and 34, a wide-faced gear 35, and a gear 36, which meshes with the teeth of the gear 35, and which is shown integrally formed with the sleeve 28. As illustrated, the gear 35 and the bevel gear 34 are both rigidly mounted on the same shaft, and the bevel gear 34 meshes with the bevel gear 33, which is rigidly mounted on the same shaft with the nut 32. With this arrangement the gear 35 can be turned in either direction by means of the nut 32, and it will consequently rotate the sleeve 28 in one direction or the other, through the agency of the gear 36. The rotation of the sleeve 28 will cause it to move in one direction or the other, along the shaft 11 and will consequently vary the distance between its inner end and the collar 28. In other words, a rotation of the nut 32 will shift the position of the sleeve 28 along the shaft 11, and will vary the distance the worm 10 is capable of moving along the shaft.

The dwell of the grinding tool, with relation to the work mounted on the table, is the interval of time the tool remains in one place on the work, and is occasioned by the fact that the worm 10 is capable of moving longitudinally along the shaft, between the collar 27 and the adjustable sleeve 28, and, while so moving, is incapable of transmitting power to the carriage. The amount or duration of the dwell is controlled by varying the position of the sleeve 28, along the shaft. The worm 10 cannot impart rotary motion to the gear 12 until it is capable of counterbalancing the reactive force of the gear 12, which, since the gear 12 is a worm gear, operates parallel to the shaft 11. For this reason the worm moves along its mounting shaft in one direction or the other, in accordance with the direction of rotation of the shaft, until it seats against either the sleeve 28 or the collar 27, and is capable of counterbalancing the reactive force of the gear 12, at which time it starts to drive the gear 12. With the worm 10 and the gear 12 located in the relative positions shown in Figs. 2 and 3 a rotation of the shaft in a direction indicated by the arrow in Fig. 2 will cause the worm 10 to move along the shaft, away from the collar 27, and into engagement with the sleeve 28, before rotary motion is imparted to the gear 12. This is due to the fact that the friction of rest of the parts, driven by the gear 8, is greater than the friction of rest between the worm 10 and its mounting shaft 11.

During the operation of the machine, the shaft 11 is rotated first in one direction and then the other, through the agency of the clutch device 17 and the mechanism controlled thereby, and consequently, the worm 10 is turned first in one direction and then the other, and it will move along the shaft away from one abutment and into engagement with the other abutment, each time the direction of rotation of the shaft 11 is changed. The carriage will therefore remain stationary during the time that the worm 10 is shifting its position relatively to the shaft 11, and the grinding tool will dwell upon the work mounted on the table. It is apparent that the duration of the dwell is equal in length to the time it takes the worm to shift its position, relatively to its mounting shaft. Consequently, the duration of the dwell may be varied by varying the distance between the sleeve 28 and the collar 27, or, in other words, by varying the throw or travel of the worm 10 along the shaft 11. This is readily accomplished by turning the milled nut 32, and the adjustment can be made with great accuracy.

In accordance with the United States patent statutes, I have illustrated and described the preferred embodiment of my invention, but I desire it to be understood that various changes, modifications and substitutions may be made in the apparatus illustrated, without departing from the spirit and scope of my invention, as set forth by the appended claims.

What I claim is:

1. In a grinding machine, a power transmission mechanism for imparting reciprocatory motion to a driven shaft, comprising a driving shaft, means for reversibly rotating the driving shaft, a driven shaft, stops mounted on the driving shaft, a worm gear mounted on the driven shaft, and a worm mounted on the driving shaft in mesh with the gear on the driven shaft and movable between the stops, whereby the driven shaft will dwell at the limits of its reciprocatory movement during the time the worm is moving from one stop to the other.

2. In a grinding machine, a power transmission mechanism for imparting reciprocatory motion to a driven shaft, comprising a driving shaft, means for reversibly rotating the driving shaft, a driven shaft, a worm gear mounted on the driven shaft, a worm mounted on the driving shaft in mesh with the gear on the driven shaft, and movable relatively thereto, and stops mounted on the driving shaft for controlling the movement of the worm, whereby the driven shaft will dwell at the limits of its reciprocatory movement, during the time the worm is moving from one stop to the other.

3. In a grinding machine, a power transmission mechanism for imparting reciprocatory motion to a driven shaft, comprising a driving shaft, means for reversibly rotating the driving shaft, a driven shaft, a worm gear mounted on the driven shaft, a worm mounted on the driving shaft in mesh with the gear on the driven shaft and movable relatively thereto, and stops for controlling the amount of relative movement between the worm and the driving shaft, whereby the driven shaft will dwell at the limits of its reciprocatory movement during the time the worm is moving from one stop to the other.

4. In a grinding machine, a power transmission mechanism for imparting reciprocatory motion to a member to be driven comprising a driving shaft, means for reversibly rotating the driving shaft, a driven shaft, stops on the driving shaft, a worm gear mounted on the driven shaft, a worm mounted on the driving shaft in mesh with the gear on the driven shaft and movable rotatively thereto between the stops, and means for adjusting the relative positions of the stops.

5. In a grinding machine a power transmission mechanism for imparting reciprocatory motion to a member to be driven, comprising a driving shaft, means for reversibly rotating the driving shaft, a driven shaft, a worm mounted on the driving shaft and movable longitudinally thereof, stops for limiting the longitudinal motion of the worm along the shaft, means for adjusting the relative positions of the stops, and a gear mounted on the driven shaft and meshing with the worm.

6. In a grinding machine, a power transmission mechanism for imparting reciprocatory motion to a member to be driven comprising a worm gear adapted to drive the member, a driving shaft, means for reversibly rotating the driving shaft, a worm in mesh with the worm gear, mounted on the driving shaft and movable thereon, stops for limiting the motion of the worm, and means for adjusting the relative positions of the stops.

7. In a grinding machine, a power transmission mechanism for imparting reciprocatory motion to a member to be driven, comprising a gear adapted to drive the member, a driving shaft, means for reversibly rotating the driving shaft, a worm in mesh with the gear for transmitting power from the shaft to the member, mounted on the shaft and movable longitudinally thereof, stops mounted on the shaft for limiting the longitudinal movement of the worm, and means for adjusting the position of one of the stops to vary the amount of movement of the worm.

8. In a grinding machine a power transmission mechanism for imparting reciprocatory motion to a member to be driven, comprising a gear adapted to drive the member, a driving shaft, means for reversibly rotating the driving shaft, a worm in mesh with the gear for transmitting power from the shaft to the member, mounted on the driving shaft and movable longitudinally thereof, an adjustable stop, for limiting the motion of the worm along the shaft, comprising a sleeve loosely mounted on the shaft and provided with screw threads on its peripheral face, means for engaging the screw threads and means for rotating the sleeve to vary its position along the shaft.

9. In a grinding machine a power transmitting mechanism for imparting reciprocatory motion to a member to be driven, comprising a gear adapted to drive the member, a driving shaft, means for reversibly rotating the driving shaft, a worm in mesh with the gear for transmitting power from the driving shaft to the member, splined on the driving shaft and movable therealong, an adjustable stop, for the worm, comprising a sleeve rotatably mounted on the shaft and screwed through a stationary member, and means for rotating the sleeve relatively to the stationary member, for varying its position along the shaft.

10. In combination in a grinding machine, a power transmission mechanism for imparting reciprocatory motion to a member to be driven, comprising a gear adapted to drive the member, a shaft, means for reversibly rotating the shaft, a worm splined on and movable along the shaft in mesh with the gear, an adjustable stop, for limiting the longitudinal motion of the worm, comprising a sleeve rotatably mounted on the shaft and screwed through a stationary member, and means for shifting the position of the sleeve along the shaft, comprising a gear rigidly mounted on the sleeve and a gear with which the sleeve gear meshes adapted to drive the sleeve gear and along which it is capable of moving during its rotation.

In testimony whereof, I have hereunto subscribed my name this 9th day of April, 1913.

MARK MUGGERIDGE.

Witnesses:
WALTER F. MURRAY,
W. THORNTON BOGERT.

Copies of this patent may be obtained for five cents each, by addressing the "Commissioner of Patents, Washington, D. C."